US012112619B2

(12) United States Patent
Sakurada et al.

(10) Patent No.: US 12,112,619 B2
(45) Date of Patent: *Oct. 8, 2024

(54) CONTROL DEVICE, SYSTEM, AND PEDESTRIAN SUPPORT METHOD

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,878

(22) Filed: Aug. 11, 2023

(65) Prior Publication Data

US 2023/0386321 A1 Nov. 30, 2023

Related U.S. Application Data

(62) Division of application No. 17/733,322, filed on Apr. 29, 2022, now Pat. No. 11,763,667.

(30) Foreign Application Priority Data

Jul. 13, 2021 (JP) ................................ 2021-115974

(51) Int. Cl.
*G08G 1/005* (2006.01)
*E01F 9/582* (2016.01)

(52) U.S. Cl.
CPC ............ *G08G 1/005* (2013.01); *E01F 9/582* (2016.02)

(58) Field of Classification Search
None
See application file for complete search history.

(56) References Cited

U.S. PATENT DOCUMENTS

| | | | | |
|---|---|---|---|---|
| 6,384,742 | B1 * | 5/2002 | Harrison | E01F 9/559 340/925 |
| 6,597,293 | B1 * | 7/2003 | Harrison | G08G 1/005 340/944 |
| 7,688,222 | B2 * | 3/2010 | Peddie | G08G 1/096783 116/63 P |
| 7,777,646 | B2 * | 8/2010 | Konforty | G08G 1/02 340/436 |
| 10,403,129 | B1 * | 9/2019 | Suarez | G08B 6/00 |
| 10,550,532 | B2 * | 2/2020 | Trifan | F21V 23/0485 |
| 2019/0088112 | A1 * | 3/2019 | Jung | G08G 1/166 |
| 2020/0356111 | A1 | 11/2020 | Takemura et al. | |

FOREIGN PATENT DOCUMENTS

JP 2014-225151 A 12/2014

* cited by examiner

*Primary Examiner* — John F Mortell
(74) *Attorney, Agent, or Firm* — Oliff PLC

(57) ABSTRACT

A control device includes a control unit configured to execute controls of displaying, on a roadway, a first crosswalk toward a first side of a roadway and displaying, on the roadway, a second crosswalk toward a second side of the roadway, and concealing the first crosswalk from the first side toward the second side while a pedestrian is crossing the roadway from the first side to the second side through the first crosswalk and the second crosswalk and concealing the second crosswalk after the pedestrian has crossed the roadway. The second side is opposite to the first side.

9 Claims, 7 Drawing Sheets

CONTROL DEVICE, SYSTEM, AND PEDESTRIAN SUPPORT METHOD

CROSS-REFERENCE TO RELATED APPLICATION

This application is a divisional application of application Ser. No. 17/733,322 filed on Apr. 29, 2022, which claims priority to Japanese Patent Application No. 2021-115974 filed on Jul. 13, 2021, the content of each of which is incorporated herein by reference in its entirety.

BACKGROUND

1. Technical Field

The present disclosure relates to a control device, a system, and a pedestrian support method.

2. Description of Related Art

Japanese Unexamined Patent Application Publication No. 2014-225151 discloses a system that provides a driver of a vehicle approaching a road corresponding to a crosswalk candidate area with information indicating that a pedestrian is crossing the road.

SUMMARY

A scheme may be suggested in which a crosswalk is displayed when a pedestrian attempts to cross a roadway at any point, and is concealed when the pedestrian finishes crossing the roadway. However, if several pedestrians continue to cross the roadway until the crosswalk is concealed, traffic congestion may be expected. Another scheme may be suggested in which the crosswalk is concealed from one side before the pedestrian finishes crossing the roadway from the one side. However, this scheme has a drawback in that the crosswalk will disappear in front of the pedestrians who are crossing the roadway from the other side.

The present disclosure provides a control device, a system, and a method that suppresses traffic congestion and helps pedestrians easily cross a roadway regardless of which side they are on.

A control device according to a first aspect of the present disclosure includes a control unit configured to execute controls of displaying, on a roadway, a first crosswalk toward a first side of the roadway and displaying, on the roadway, a second crosswalk toward a second side of the roadway, and concealing the first crosswalk from the first side toward the second side while a pedestrian is crossing the roadway from the first side to the second side through the first crosswalk and the second crosswalk and concealing the second crosswalk after the pedestrian has crossed the roadway. The second side is opposite to the first side.

A pedestrian support method according to a second aspect of the present disclosure includes displaying, on a roadway, a first crosswalk toward a first side of the roadway and displaying, on the roadway, a second crosswalk toward a second side of the roadway, concealing the first crosswalk from the first side toward the second side while a pedestrian is crossing the roadway from the first side to the second side through the first crosswalk and the second crosswalk, and concealing the second crosswalk after the pedestrian has crossed the roadway. The second side is opposite to the first side.

With each aspect of the present disclosure, it is possible to suppress traffic congestion and to help pedestrians easily cross a roadway regardless of which side they are on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
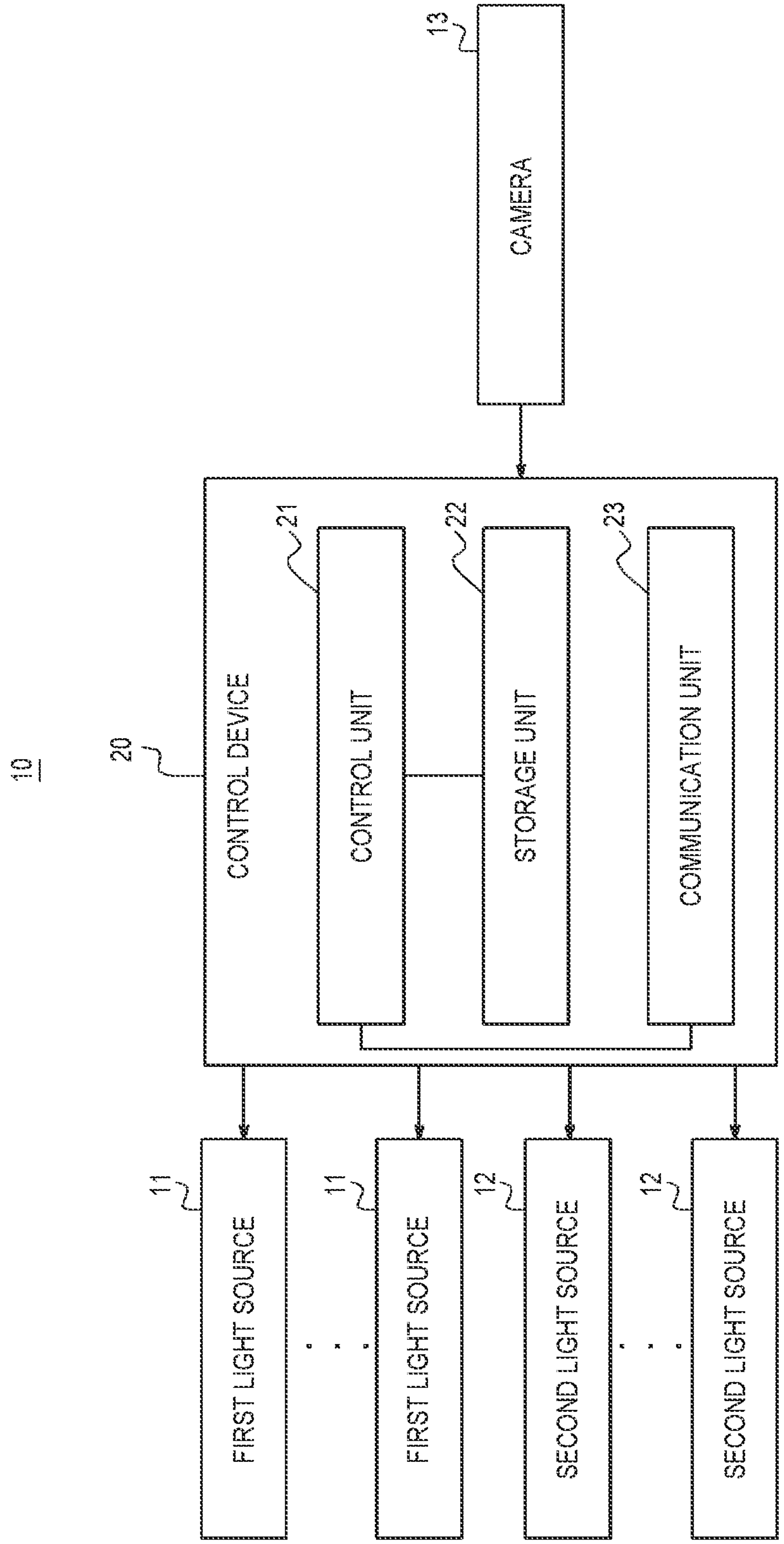
FIG. 1 is a diagram illustrating a configuration of a system according to an embodiment of the present disclosure.

Hereinafter, several embodiments of the present disclosure will be described with reference to drawings.

In each of the drawings, the same or equivalent components are denoted by the same reference numerals. For the description of each embodiment, the descriptions of the same or equivalent components will be appropriately omitted or simplified.

An embodiment of the present disclosure will be described hereinbelow.

A configuration of a system 10 according to the present embodiment will be described referring to FIGS. 1 to 4.

As shown in FIG. 1, the system 10 according to the present embodiment includes a plurality of first light sources 11, a plurality of second light sources 12, a camera 13, and a control device 20. The control device 20 can communicate with the plurality of first light sources 11, the plurality of second light sources 12, and the camera 13 via a network such as LAN or the Internet, via a dedicated line, or wirelessly. "LAN" is an abbreviation for local area network.

Figure 2:
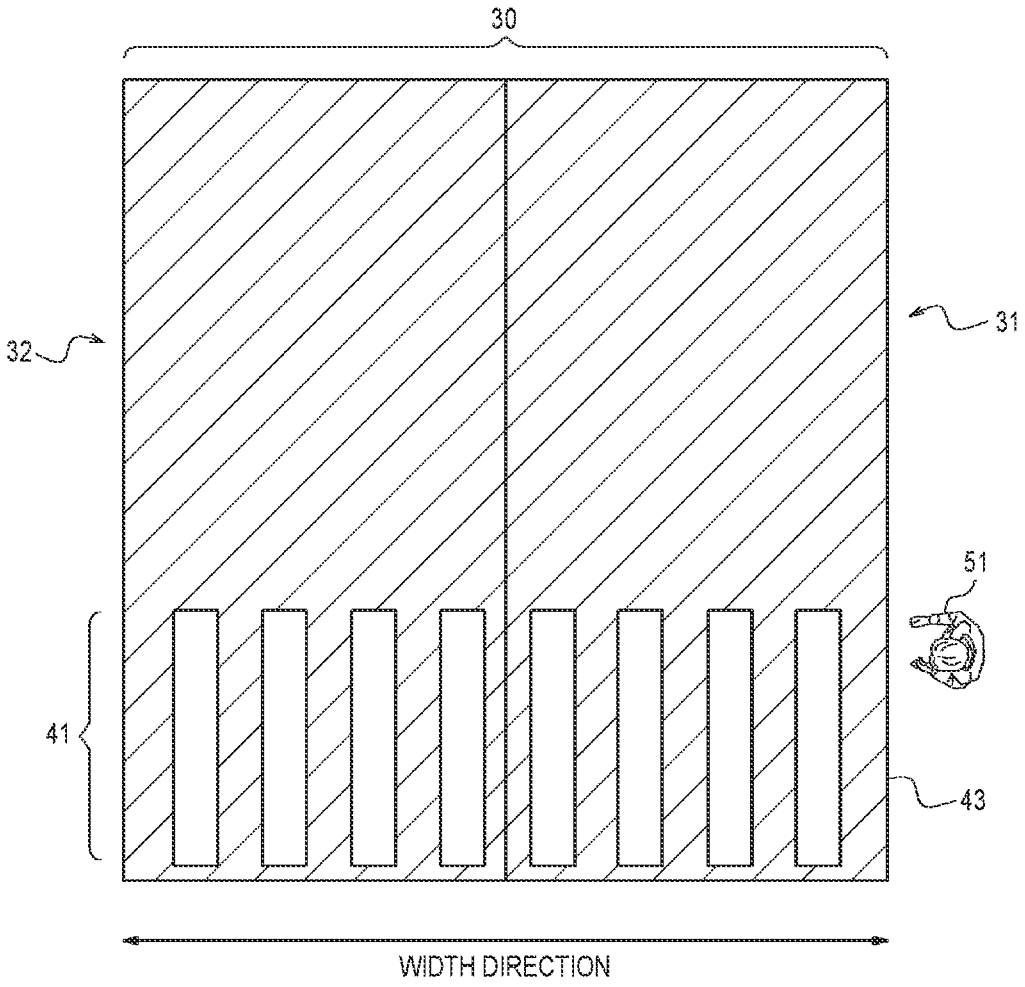
FIG. 2 is a diagram illustrating an exemplified first crosswalk according to the embodiment of the present disclosure.
Figure 3:
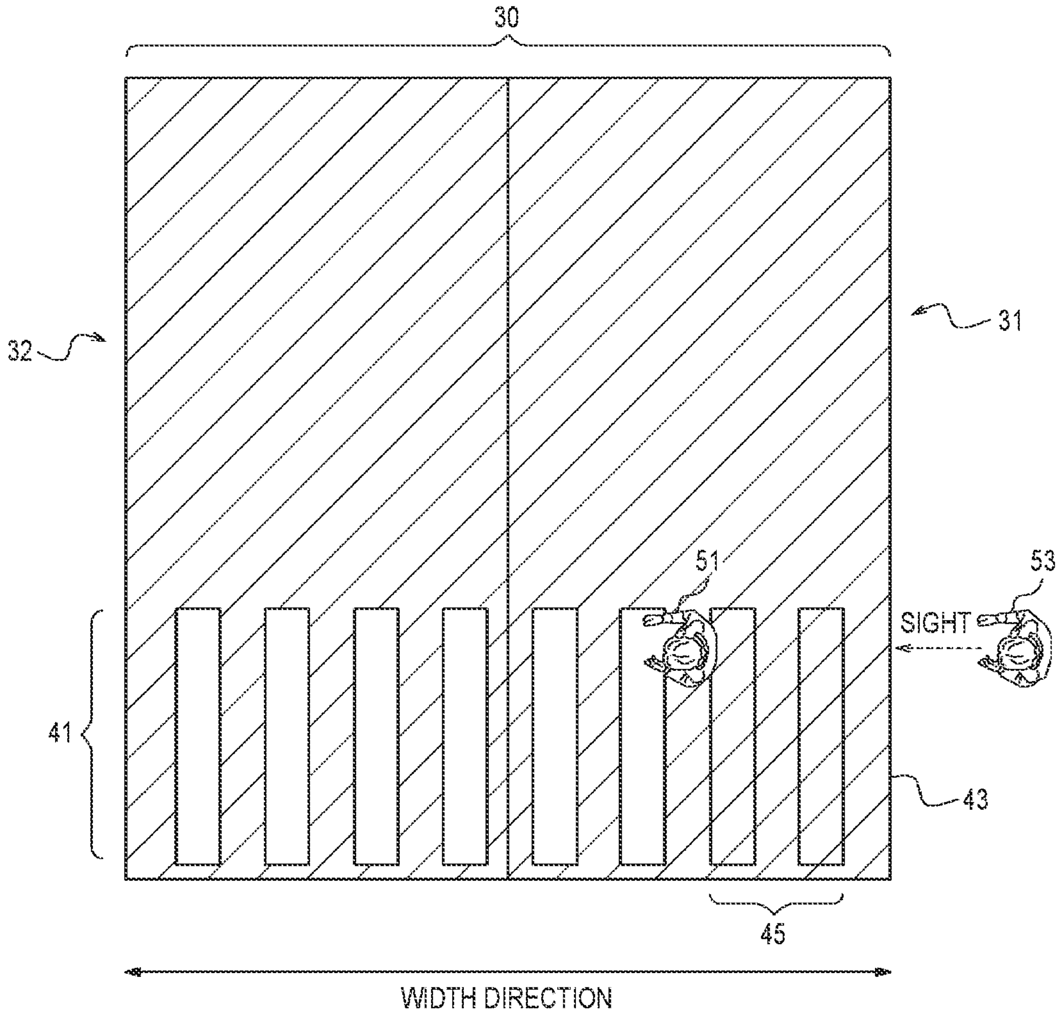
FIG. 3 is a diagram illustrating an exemplified first crosswalk according to the embodiment of the present disclosure.
Figure 4:
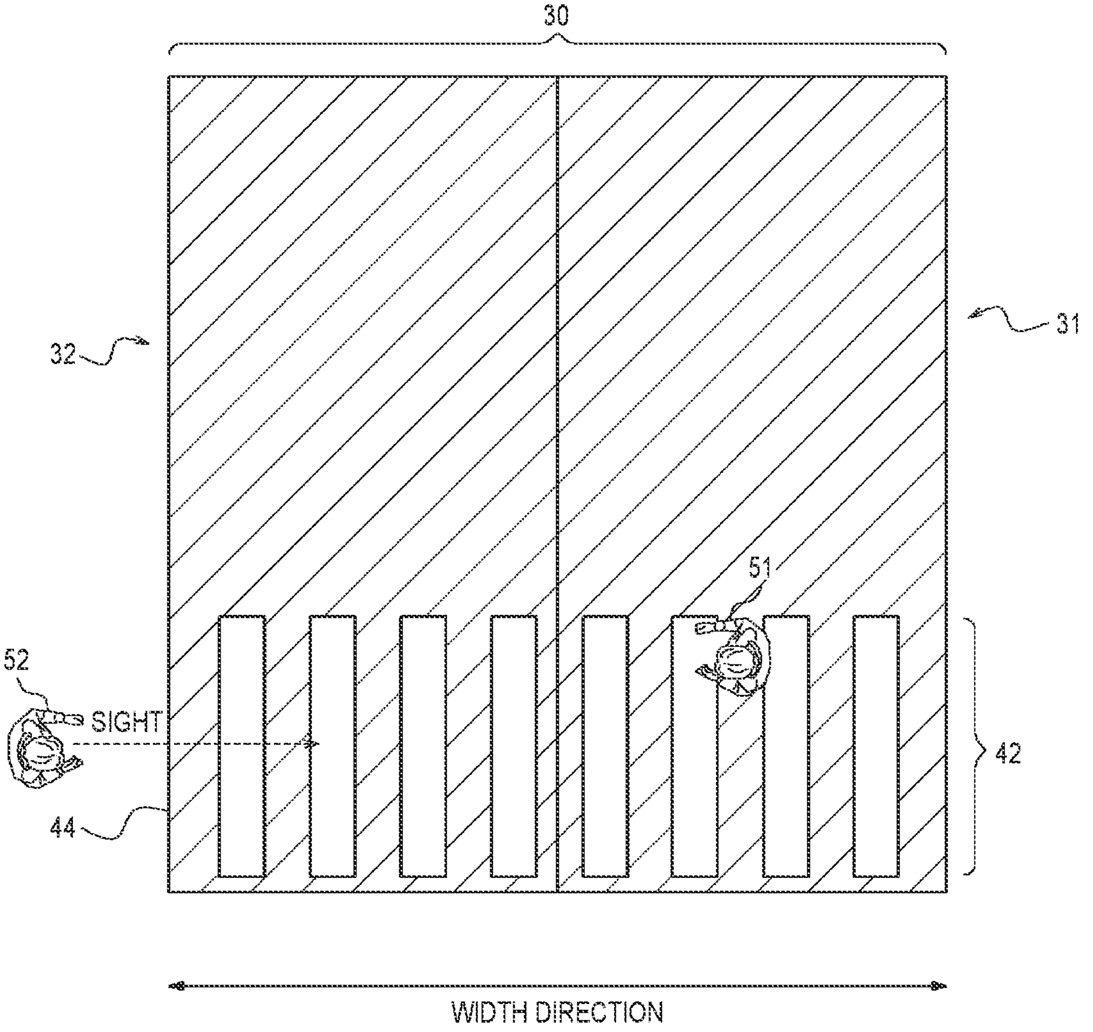
FIG. 4 is a diagram illustrating an exemplified second crosswalk according to the embodiment of the present disclosure.

The plurality of first light sources 11 is installed on a roadway 30 as shown in FIGS. 2 to 4. In the present embodiment, the plurality of first light sources 11 is embedded in the roadway 30 such that they do not protrude from a road surface, but may be embedded in the roadway 30 to protrude from the road surface, or alternatively, may be mounted on the road surface. The plurality of first light sources 11 emits light toward a first side 31 of the roadway 30 to display a first crosswalk 41 toward the first side 31 on the roadway 30. Therefore, the first crosswalk 41 can be visually recognized on the first side 31 of the roadway 30, while not visually recognized on a second side 32 opposite to the first side 31 of the roadway 30. Alternatively, the first crosswalk 41 is easily recognizable on the first side 31 of the roadway 30, but difficult to be recognized on the second side 32 of the roadway 30.

Each first light source 11 includes at least one light emitting element. Example of the light emitting element includes an LED or a laser diode. "LED" is an abbreviation for light emitting diode. Each first light source 11 may further include a blocking material that blocks light directed in a direction other than the first side 31, such as light directed toward the second side 32. Alternatively, each first light source 11 may include, as the light emitting element, an element that emits directional light toward the first side 31.

The plurality of second light sources 12 is also installed on the roadway 30 as shown in FIGS. 2 to 4. In the present embodiment, the plurality of second light sources 12 is embedded in the roadway 30 such that they do not protrude from the road surface, but may be embedded in the roadway 30 to protrude from the road surface, or alternatively, may be mounted on the road surface. The plurality of second light sources 12 emits light toward the second side 32 of the roadway 30 to display a second crosswalk 42 toward the second side 32 on the roadway 30. Therefore, the second crosswalk 42 can be visually recognized on the second side 32 of the roadway 30, while not visually recognized on the first side 31 of the roadway 30. Alternatively, the second crosswalk 42 is easily recognizable on the first side 31 of the roadway 30, but difficult to be recognized on the second side 32 of the roadway 30.

Each second light source 12 includes at least one light emitting element. Examples of the light emitting element include an LED or a laser diode. Each second light source 12 may further include a blocking material that blocks light directed in a direction other than the second side 32, such as light directed toward the first side 31. Alternatively, each second light source 12 may include, as the light emitting element, an element that emits directional light toward the second side 32.

In the present embodiment, the plurality of first light sources 11 is distributed and installed in a plurality of first regions along a width direction of the roadway 30. The plurality of second light sources 12 is distributed and installed in a plurality of second regions along the width direction of the roadway 30.

The plurality of first regions and the plurality of second regions are set to overlap each other. For example, assuming that eight rectangular regions corresponding to both the first regions and the second regions are arranged along the width direction of the roadway 30, the first crosswalk 41 is displayed in a form shown in FIGS. 2 and 3, and the second crosswalk 42 is displayed in a form shown in FIG. 4. In each rectangular region, a point light source group as each first light source 11 and a point light source group as each second light source 12 are arranged so as to be intermixed. The number of regions is not limited to eight and may be tailored as appropriate. The shape of each region is not limited to a rectangle and may be customized as appropriate.

The plurality of first regions and the plurality of second regions may be set such that the first region and the second region are alternately arranged one by one, instead of being set to overlap each other. For example, assuming that 16 rectangular regions are lined up along the width direction of the roadway 30, eight rectangular regions that are odd-numbered from the first side 31 or the second side 32 correspond to the first regions, and eight rectangular regions that are even-numbered correspond to the second regions, respectively. A point light source group or a rectangular surface light source is arranged as a respective first light source 11 in each odd-numbered rectangular region. A point light source group or a rectangular surface light source is arranged as a respective second light source 12 in each even-numbered rectangular region. The number of regions is not limited to 16 and may be customized as appropriate. The shape of each region is not limited to a rectangle and may be customized as appropriate.

The camera 13 is installed at a point where a pedestrian attempting to cross the roadway 30 and a pedestrian crossing the roadway 30 can be captured in images, such as in the vicinity of the roadway 30.

The control device 20 may be installed on the roadway 30, may be installed in the vicinity of the roadway 30, or may be installed in a remote place.

On the roadway 30, the control device 20 controls displaying of the first crosswalk 41 toward the first side 31 of the roadway 30, and displaying of the second crosswalk 42 toward the second side 32 of the roadway 30. The control device 20 conceals the first crosswalk 41 from the first side 31 to the second side 32 while the pedestrian is crossing the roadway 30 from the first side 31 to the second side 32 through the first crosswalk 41 and the second crosswalk 42. The control device 20 conceals the second crosswalk 42 after the pedestrian has crossed the roadway 30.

In the present embodiment, as shown in FIG. 3, it is possible to easily prevent several pedestrians from continuing to cross the roadway 30 from the first side 31 by concealing the first crosswalk 41 from the first side 31 before the pedestrian finishes crossing the roadway 30 from the first side 31. Consequently, it is expected that traffic congestion is less likely to occur. It is possible to allow a pedestrian crossing the roadway 30 from the second side 32 to cross the roadway 30 easier by concealing the second crosswalk 42 after the pedestrian finishes crossing the roadway 30 from the first side 31. In other words, according to the present embodiment, it is possible to suppress traffic congestion and to help the pedestrians easily cross a roadway 30 regardless of which side they are on.

The control device 20 includes a control unit 21, a storage unit 22, and a communication unit 23, as illustrated in FIG. 1.

The control unit 21 includes at least one processor, at least one programmable circuit, at least one dedicated circuit, or a combination thereof. The processor is a general-purpose processor (such as CPU or GPU) or a dedicated processor specialized for specific processing. "CPU" is an abbreviation for central processing unit. "GPU" is an abbreviation for graphics processing unit. Example of the programmable circuit includes an FPGA. "FPGA" is an abbreviation for field-programmable gate array. Example of the dedicated circuit includes an ASIC. "ASIC" is an abbreviation for application specific integrated circuit. The control unit 21 executes processes related to operations of the control device 20 while controlling each unit of the control device 20.

The storage unit 22 includes at least one semiconductor memory, at least one magnetic memory, at least one optical memory, or a combination thereof. Examples of the semiconductor memory include RAM or ROM. "RAM" is an abbreviation for random access memory. "ROM" is an abbreviation for read only memory. Examples of the RAM include SRAM or DRAM. "SRAM" is an abbreviation for static random access memory. "DRAM" is an abbreviation for dynamic random access memory. Example of the ROM includes EEPROM. "EEPROM" is an abbreviation for electrically erasable programmable read only memory. The storage unit 22 may function as, for example, a main storage device, an auxiliary storage device, or a cache memory. The storage unit 22 stores data used for the operations of the control device 20, and data acquired by the operations of the control device 20.

The communication unit 23 includes at least one communication interface. Examples of the communication interface include a LAN interface, an interface corresponding to a mobile communication protocol such as LTE, 4G or 5G, or alternatively, an interface corresponding to a short-range wireless communication protocol such as Bluetooth (registered trademark). "LTE" is an abbreviation for Long Term Evolution. "4G" is an abbreviation for 4th generation. "5G" is an abbreviation for 5th generation. The communication unit 23 receives the data used for the operations of the control device 20 and transmits the data acquired by the operations of the control device 20 to a light source.

Functions of the control device 20 are implemented by executing a program according to the present embodiment with a processor serving as the control unit 21. In other words, the functions of the control device 20 are implemented by software. The program allows a computer to function as the control device 20 by causing the computer to execute the operations of the control device 20. In other words, the computer functions as the control device 20 by executing the operations of the control device 20 according to the program.

The program can be stored in a computer-readable non-transitory medium. Examples of the computer-readable non-transitory medium include a flash memory, a magnetic recording device, an optical disc, a magneto-optical recording medium, or a ROM. The program is distributed, for example, by selling, transferring, or lending a portable medium such as an SD card, a DVD or a CD-ROM in which the program is stored. "SD" is an abbreviation for "Secure Digital". "DVD" is an abbreviation for digital versatile disc. "CD-ROM" is an abbreviation for compact disc read only memory. The program may be stored in a storage of the server and transferred from the server to another computer to distribute the program. The program may be provided as a program product.

The computer temporarily stores the program recorded in the portable medium or the program transferred from the server, for example, in the main storage device. Then, the computer causes the processor to read the program stored in the main storage device, and causes the processor to execute processing according to the read program. The computer may read the program directly from the portable medium and execute processing according to the program. The computer may sequentially execute the processing according to the received program each time the program is transferred from the server to the computer. Instead of transferring the program from the server to the computer, the processing may be executed by a so-called ASP service that implements the function only by instructing the execution and obtaining the result. "ASP" is an abbreviation for application service provider. The program includes information used for processing by an electronic computer, which is equivalent to the program. For example, data that is not a direct command to a computer but has the property of defining the processing of the computer corresponds to "equivalent to the program".

Some or all of the functions of the control device 20 may be implemented by the programmable circuit or the dedicated circuit serving as the control unit 21. In other words, some or all of the functions of the control device 20 may be implemented by hardware.

An operation of the system 10 according to the present embodiment will be described referring to FIG. 5. This operation corresponds to the pedestrian support method according to the present embodiment. Operations of the control device 20 included in this operation correspond to a control method according to the present embodiment.

In step S101, the control unit 21 of the control device 20 determines whether a first pedestrian 51, standing on the first side 31 of the roadway 30, is attempting to cross the roadway 30 from the first side 31 to the second side 32. This process may be executed by any procedure, but will be executed by the following procedure in the present embodiment.

The camera 13 captures an image of a certain range and a periphery of the range, in which the plurality of first light sources 11 and the plurality of second light sources 12 of the roadway 30 are installed. The communication unit 23 of the control device 20 receives the image taken by the camera 13. The control unit 21 of the control device 20 acquires the image received by the communication unit 23. The control unit 21 determines whether there is the first pedestrian 51, and if there is, whether they attempt to cross the roadway 30 from the first side 31 to the second side 32, by analyzing the acquired image. A known method can be used for image analysis. Machine learning such as deep learning may be adopted. In particular, the control unit 21 determines that the first pedestrian 51 is attempting to cross the roadway 30 from the first side 31 to the second side 32, in a case where the first pedestrian 51 is facing the roadway 30 on the first side 31 but has not moved for at least a certain period of time. Alternatively, the control unit 21 determines that the first pedestrian 51 is attempting to cross the roadway 30 from the first side 31 to the second side 32, in a case where the first pedestrian 51 makes a certain gesture, for example, holds up their hand on the first side 31.

In a case where it is determined that the first pedestrian 51 is not attempting to cross the roadway 30 from the first side 31 to the second side 32, that is, in a case where the pedestrian attempting to cross the roadway 30 from the first side 31 to the second side 32 is not detected, the process of step S101 is executed again. In a case where it is determined that the first pedestrian 51 is attempting to cross the roadway 30 from the first side 31 to the second side 32, that is, in a case where the pedestrian attempting to cross the roadway 30 from the first side 31 to the second side 32 is detected, the process of step S102 is executed.

On the roadway 30, the control unit 21 of the control device 20 controls displaying of the first crosswalk 41 toward the first side 31 of the roadway 30, and displaying of the second crosswalk 42 toward the second side 32 of the roadway 30, in step S102. This process may be executed by any procedure, but will be executed by the following procedure in the present embodiment.

The control unit 21 of the control device 20 causes the communication unit 23 to transmit first instruction data to instruct the plurality of first light sources 11 to emit light toward the first side 31 of the roadway 30 and second instruction data to instruct the plurality of second light sources 12 to emit light toward the second side 32 of the roadway 30. The communication unit 23 transmits the first instruction data to the plurality of first light sources 11, and transmits the second instruction data to the plurality of second light sources 12. The plurality of first light sources 11 emits light according to the first instruction data to display the first crosswalk 41 toward the first side 31 on the roadway 30, as shown in FIG. 2. The plurality of second light sources

12 emits light according to the second instruction data to display the second crosswalk 42 toward the second side 32 on the roadway 30.

In step S103, the control unit 21 of the control device 20 determines whether the first pedestrian 51 has started crossing the roadway 30. This process may be executed by any procedure, but will be executed by the following procedure in the present embodiment.

The control unit 21 of the control device 20 acquires an image taken by the camera 13 similarly to step S101. The control unit 21 determines whether or not the first pedestrian 51 has started crossing the roadway 30 by analyzing the acquired image. In particular, the control unit 21 determines that the first pedestrian 51 has started crossing the roadway 30 in a case where the first pedestrian 51 is closer to the second side 32 than an end 43 of the first crosswalk 41 on the first side 31.

In a case where it is determined that the first pedestrian 51 has not begun to cross the roadway 30, the process of step S103 is executed again. In a case where it is determined that the first pedestrian 51 has started crossing the roadway 30, the process of step S104 is executed.

In step S104, the control unit 21 of the control device 20 conceals an area of the first crosswalk 41 that the first pedestrian 51 has passed while the first pedestrian 51 is crossing. This process may be executed by any procedure, but will be executed by the following procedure in the present embodiment.

The control unit 21 of the control device 20 acquires an image taken by the camera 13 similarly to step S101. The control unit 21 identifies an area of the first crosswalk 41 that the first pedestrian 51 has passed by analyzing the acquired image. The control unit 21 selects the first light source 11 located in the identified area from the plurality of first light sources 11. The control unit 21 causes the communication unit 23 to transmit third instruction data to instruct the selected first light source 11 to stop emitting light. The communication unit 23 transmits the third instruction data to the first light source 11 selected by the control unit 21. The first light source 11 selected by the control unit 21 stops emitting light according to the third instruction data, thereby concealing the area of the first crosswalk 41 that the first pedestrian 51 has passed. In other words, the control unit 21 expands a concealed range 45 of the first crosswalk 41 as the first pedestrian 51 advances on the roadway 30, as shown in FIG. 3. For the second crosswalk 42, the control unit 21 keeps displaying all of the second crosswalk 42 while the first pedestrian 51 is crossing until the first pedestrian 51 finishes crossing the roadway 30, as shown in FIG. 4.

In step S105, the control unit 21 of the control device 20 determines whether the first pedestrian 51 has finished crossing the roadway 30. This process may be executed by any procedure, but will be executed by the following procedure in the present embodiment.

The control unit 21 of the control device 20 acquires an image taken by the camera 13 similarly to step S101. The control unit 21 determines whether the first pedestrian 51 has finished crossing the roadway 30 by analyzing the acquired image. In particular, the control unit 21 determines that the first pedestrian 51 has finished crossing the roadway 30 in a case where the first pedestrian 51 stands on the second side 32.

In a case where it is determined that the first pedestrian 51 has not finished crossing the roadway 30, the process of step S104 is executed again. The first crosswalk 41 is concealed from the first side 31 toward the second side 32 by executing the process of step S104 repeatedly while the first pedestrian 51 is crossing. In a case where it is determined that the first pedestrian 51 has finished crossing the roadway 30, the process of step S106 is executed.

In step S106, the control unit 21 of the control device 20 conceals the entire second crosswalk 42 after the first pedestrian 51 has crossed. This process may be executed by any procedure, but will be executed by the following procedure in the present embodiment.

The control unit 21 of the control device 20 causes the communication unit 23 to transmit fourth instruction data to instruct the plurality of second light sources 12 to stop emitting light. The communication unit 23 transmits the fourth instruction data to the plurality of second light sources 12. The plurality of second light sources 12 stops emitting light according to the fourth instruction data to conceal all of the second crosswalk 42.

As stated above, in the present embodiment, the control unit 21 of the control device 20 independently controls displaying of the first crosswalk 41 for the first pedestrian 51 on one of the left and right sides of the roadway 30, and displaying of the second crosswalk 42 for the second pedestrian 52 on the other of the left and right sides of the roadway 30. As shown in FIG. 2, when it is determined that the first pedestrian 51 is attempting to cross the roadway 30, the control unit 21 causes the plurality of first light sources 11 and the plurality of second light sources 12 to display the first crosswalk 41 and the second crosswalk 42, respectively. The control unit 21 of the control device 20 conceals an area of the first crosswalk 41 that the first pedestrian 51 has passed while the first pedestrian 51 is crossing, as shown in FIG. 3. Therefore, when viewed from a subsequent third pedestrian 53, the crosswalk disappears behind the first pedestrian 51. The control unit 21 conceals the second crosswalk 42 when the first pedestrian 51 has finished crossing the roadway 30. As shown in FIG. 4, all of the second crosswalk 42 keeps being displayed until the first pedestrian 51 finishes crossing the roadway 30. Therefore, when viewed from the second pedestrian 52, the crosswalk does not disappear. The second pedestrian 52 can also start crossing while the first pedestrian 51 is crossing.

According to the present embodiment, as shown in FIG. 3, it is possible to prevent the third pedestrian 53 from crossing the roadway 30 following the first pedestrian 51 and suppress traffic congestion by sequentially concealing an area of the first crosswalk 41 that the first pedestrian 51 has already passed. Since the second crosswalk 42 is concealed after the first pedestrian 51 finishes crossing, the second pedestrian 52 can also cross the roadway 30 while the first pedestrian 51 is crossing. In other words, because the crosswalk keeps being displayed without disappearing for pedestrians crossing from either side of the roadway 30, it is possible to support pedestrians in easily crossing the roadway 30 from both sides.

As one modified example of the present embodiment, sequentially concealing an area of the first crosswalk 41 that the pedestrian has already passed may be performed based on information on the other pedestrian following them. For example, the control unit 21 of the control device 20 may adjust a time at which the first crosswalk 41 begins to be concealed according to an expected arrival time when the third pedestrian 53, who is the other pedestrian following the first pedestrian 51, arrives at the end 43 of the first crosswalk 41 on the first side 31. This process may be executed by any procedure, but will be executed by the following procedure in this modified example.

When shifting from step S103 to step S104, the control unit 21 of the control device 20 acquires an image taken by the camera 13 similarly to step S101. The control unit 21 specifies a distance between a position of the third pedestrian 53 and the end 43 of the first crosswalk 41 by analyzing the acquired image. The control unit 21 calculates the expected arrival time at which the third pedestrian 53 will arrive at the end 43 of the first crosswalk 41 by dividing the specified distance by standard walking speed or actual walking speed of the third pedestrian 53 that is identified from the image. The control unit 21 sets the time at which the first crosswalk 41 begins to be concealed to be later than the expected arrival time in a case where a time period from a time when the first pedestrian 51 starts crossing the roadway 30 to the expected arrival time is less than a threshold. That is, in a case where the time period from the time when the first pedestrian 51 starts crossing the roadway 30 to the expected arrival time is less than the threshold, the process of step S104 is not initiated until the expected arrival time.

According to this modified example, if the third pedestrian 53 following the first pedestrian 51 is likely to start crossing the roadway 30 almost immediately, a timing at which the first crosswalk 41 begins to be concealed is delayed, whereby the third pedestrian 53 can also start crossing the roadway 30 while the first pedestrian 51 is crossing.

As one modified example of the present embodiment, when the crosswalk is concealed, pedestrians or a vehicle may be notified that the crosswalk will disappear by blinking or changing the color of the crosswalk.

Figure 6:
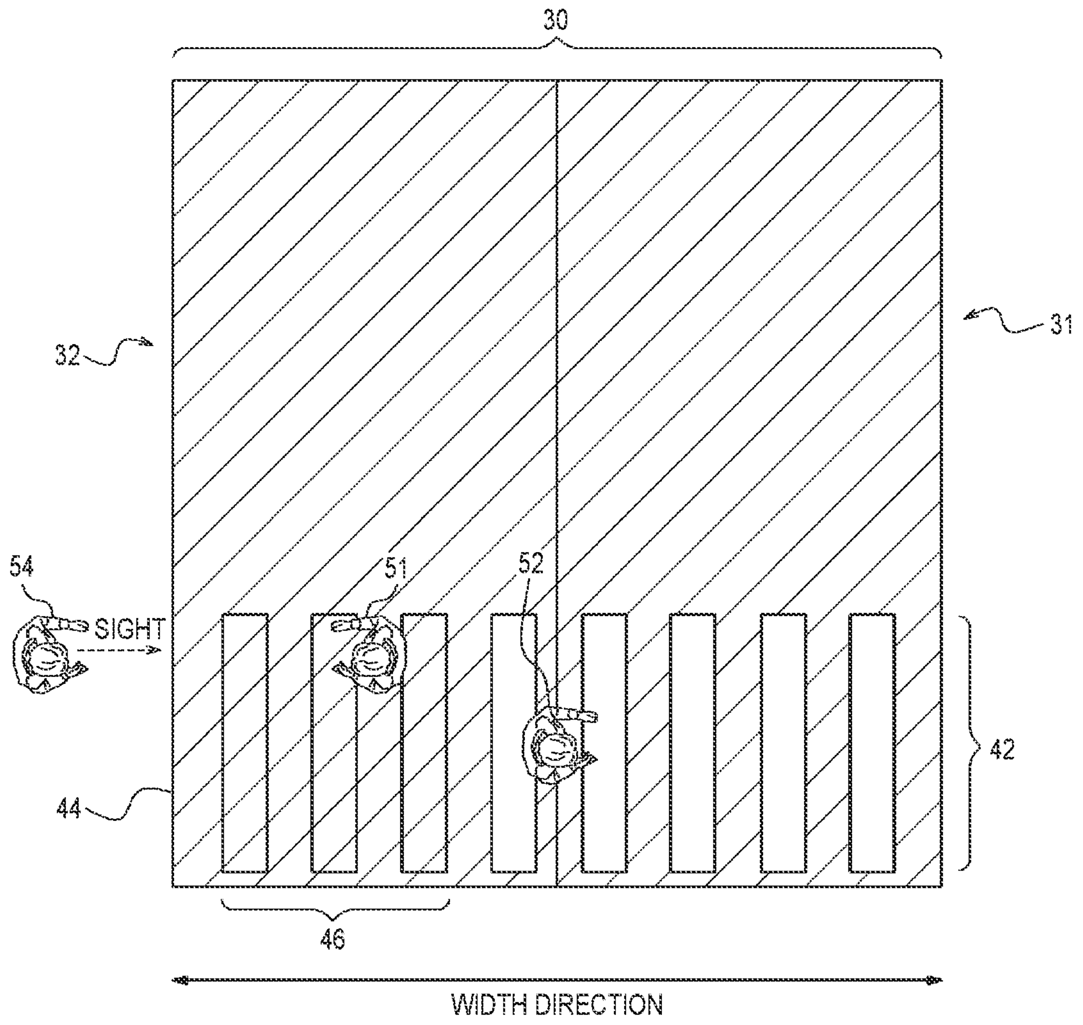
FIG. 6 is a diagram illustrating an exemplified second crosswalk according to a modified example of the embodiment of the present disclosure.

As one modified example of the present embodiment, when the second pedestrian 52 starts crossing while the first pedestrian 51 is crossing, the second crosswalk 42 for the second pedestrian 52 may be sequentially concealed from an area that the second pedestrian 52 has already passed, even if the first pedestrian 51 is crossing, as shown in FIG. 6. Such a modified example will be described as another embodiment hereinbelow.

Figure 7:
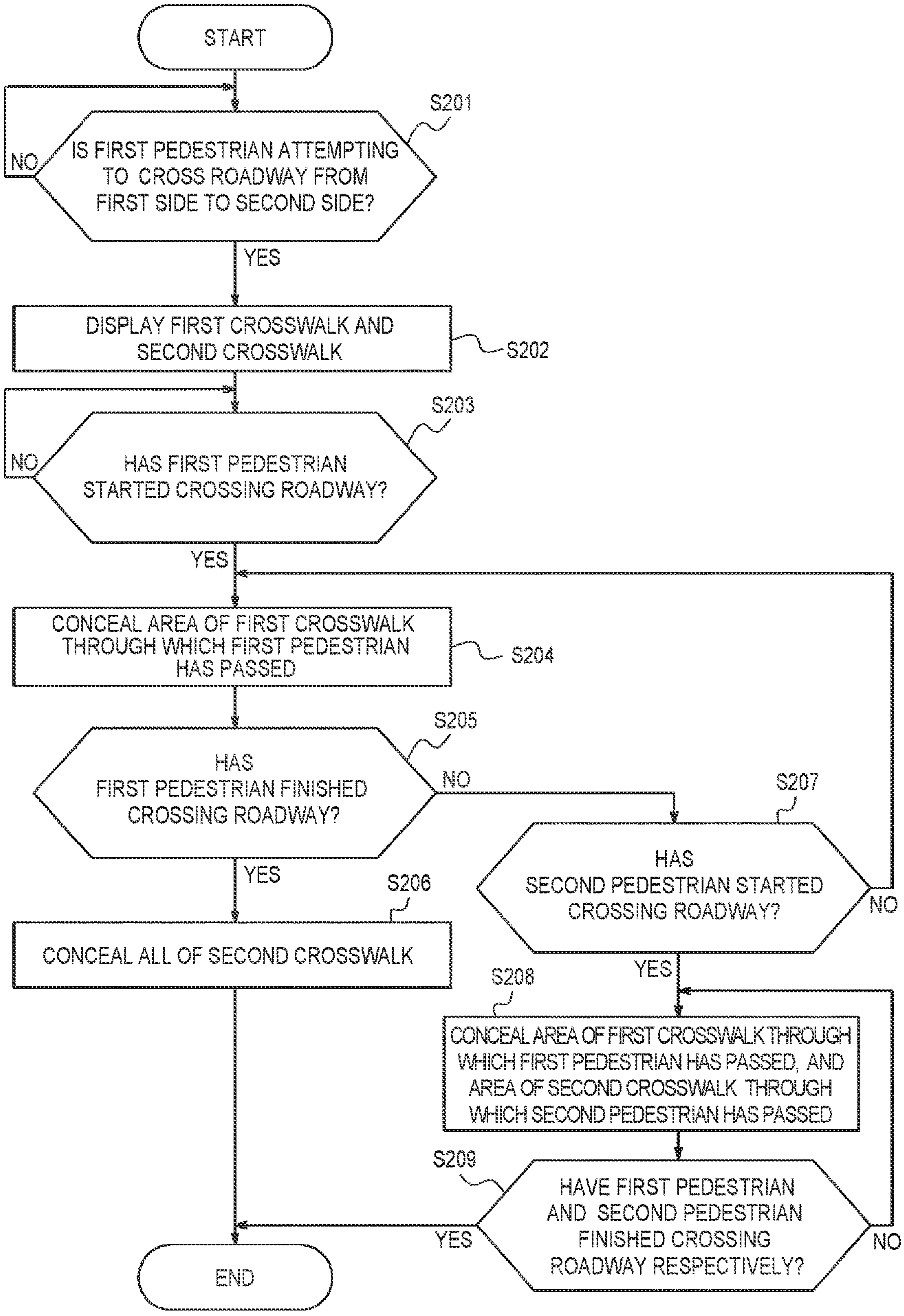
FIG. 7 is a flowchart illustrating an operation of the system according to a modified example of the embodiment of the present disclosure.

Operations of the system 10 according to the present embodiment will be described referring to FIG. 7.

Figure 5:
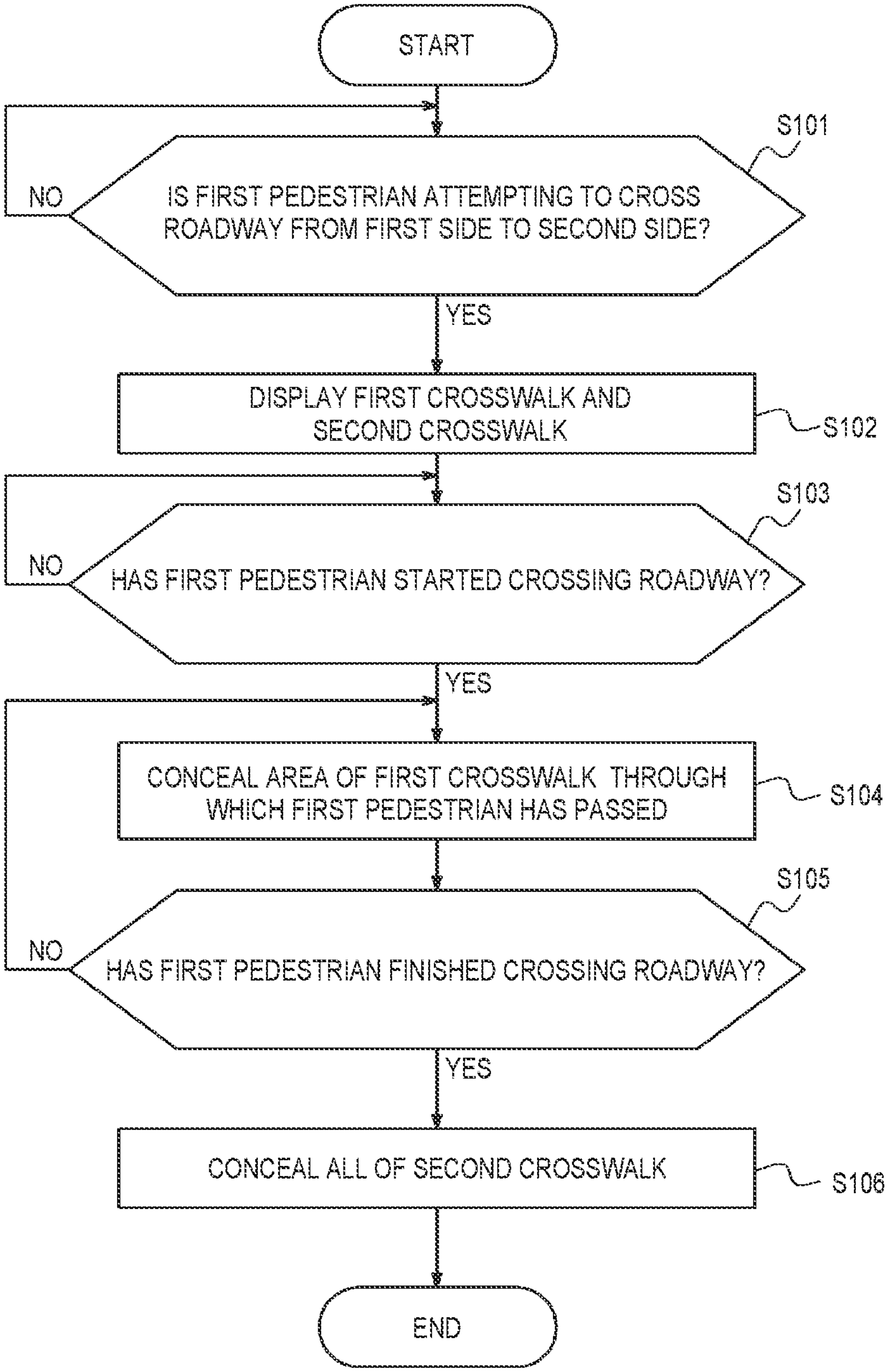
FIG. 5 is a flowchart illustrating an operation of the system according to the embodiment of the present disclosure.

Since the processes of steps S201 to S206 are the same as the processes of steps S101 to S106 of FIG. 5, the descriptions thereof will be omitted.

In a case where it is determined that the first pedestrian 51 has not finished crossing the roadway 30 in step S205, the process of step S207 is executed.

In step S207, the control unit 21 of the control device 20 determines whether the second pedestrian 52 has started crossing the roadway 30. This process may be executed by any procedure, but will be executed by the following procedure in the present embodiment.

The control unit 21 of the control device 20 acquires an image taken by the camera 13 similarly to step S201. The control unit 21 determines whether the second pedestrian 52 has started crossing the roadway 30 by analyzing the acquired image. In particular, the control unit 21 determines that the second pedestrian 52 has started crossing the roadway 30 in a case where the second pedestrian 52 is closer to the first side 31 than an end 44 of the second crosswalk 42 on the second side 32.

In a case where it is determined that the second pedestrian 52 has not begun to cross the roadway 30, the process of step S204 is executed again. The first crosswalk 41 is concealed from the first side 31 toward the second side 32 by executing the process of step S204 repeatedly while the first pedestrian 51 is crossing. In a case where it is determined that the second pedestrian 52 has started crossing the roadway 30, the process of step S208 is executed.

In step S208, the control unit 21 of the control device 20 conceals an area of the first crosswalk 41 that the first pedestrian 51 has passed while the first pedestrian 51 is crossing. The procedure for executing this process is the same as the process in step S204, thus the description thereof will be omitted. The control unit 21 of the control device 20 conceals an area of the second crosswalk 42 that the second pedestrian 52 has passed while the second pedestrian 52 is crossing. This process may be executed by any procedure, but will be executed by the following procedure in the present embodiment.

The control unit 21 of the control device 20 acquires an image taken by the camera 13 similarly to step S201. The control unit 21 identifies an area of the second crosswalk 42 that the second pedestrian 52 has passed by analyzing the acquired image. The control unit 21 selects the second light source 12 located in the identified area from the plurality of second light sources 12. The control unit 21 causes the communication unit 23 to transmit fifth instruction data to instruct the selected second light source 12 to stop emitting light. The communication unit 23 transmits the fifth instruction data to the second light source 12 selected by the control unit 21. The second light source 12 selected by the control unit 21 stops emitting light according to the fifth instruction data, thereby concealing the area of the second crosswalk 42 that the second pedestrian 52 has passed. In other words, the control unit 21 expands a concealed range 46 of the second crosswalk 42 as the second pedestrian 52 advances on the roadway 30, as shown in FIG. 6.

In step S209, the control unit 21 of the control device 20 determines whether the first pedestrian 51 and the second pedestrian 52 have finished crossing the roadway 30, respectively. This process may be executed by any procedure, but will be executed by the following procedure in the present embodiment.

The control unit 21 of the control device 20 acquires an image taken by the camera 13 similarly to step S201. The control unit 21 determines whether the first pedestrian 51 and the second pedestrian 52 have finished crossing the roadway 30, respectively, by analyzing the image acquired. In particular, the control unit 21 determines that the first pedestrian 51 has finished crossing the roadway 30 in a case where the first pedestrian 51 stands on the second side 32. The control unit 21 determines that the second pedestrian 52 has finished crossing the roadway 30 in a case where the second pedestrian 52 stands on the first side 31.

In a case where it is determined that the first pedestrian 51 and the second pedestrian 52 have not finished crossing the roadway 30, the process of step S208 is executed again. The first crosswalk 41 is concealed from the first side 31 toward the second side 32 by executing the process of step S208 repeatedly while the first pedestrian 51 is crossing. The second crosswalk 42 is concealed from the second side 32 toward the first side 31 by executing the process of step S208 repeatedly while the second pedestrian 52 is crossing. In a case where it is determined that the first pedestrian 51 and the second pedestrian 52 have finished crossing the roadway 30, respectively, the workflow of FIG. 7 ends.

As stated above, in the present embodiment, the control unit 21 of the control device 20 keeps displaying all of the second crosswalk 42 until the first pedestrian 51 finishes crossing the roadway 30, in a case where there is no second pedestrian 52 crossing the roadway 30 from the second side 32 to the first side 31 through the first crosswalk 41 and the second crosswalk 42 while the first pedestrian 51 is crossing. In a case where the second pedestrian 52 is detected while the first pedestrian 51 is crossing, the control unit 21 conceals the second crosswalk 42 from the second side 32 toward the first side 31 while the second pedestrian 52 is crossing. In other words, in a case where there is the second pedestrian 52 crossing the roadway 30, the control unit 21 of the control device 20 conceals an area of the second crosswalk 42 that the second pedestrian 52 has passed even if the first pedestrian 51 is crossing, as shown in FIG. 6. Therefore, when viewed from a subsequent fourth pedestrian 54, the crosswalk disappears behind the second pedestrian 52.

According to the present embodiment, as shown in FIG. 6, it is possible to prevent the fourth pedestrian 54 from crossing the roadway 30 following the second pedestrian 52 and suppress traffic congestion by sequentially concealing an area of the second crosswalk 42 that the second pedestrian 52 has already passed.

The present disclosure is not limited to the embodiments stated above. For example, at least two blocks described in the block diagram may be integrated, or alternatively, a single block may be divided into several blocks. Instead of executing at least two steps described in the flowchart in chronological order according to the description, the steps may be executed in parallel or in a different order depending on the processing capability of the device executing the steps, or as necessary. Other changes or modifications can be made without departing from the spirit of the present disclosure.

What is claimed is:

1. A pedestrian support method comprising:

capturing, with a camera, an image of a range in which a plurality of first light sources and a plurality of second light sources are installed, wherein the plurality of first light sources are installed on a roadway and configured to display a first crosswalk by emitting light toward a first side and the plurality of second light sources are installed on the roadway and configured to display a second crosswalk by emitting light toward a second side, the second side being opposite to the first side;

acquiring and analyzing the image captured by the camera;

concealing the first crosswalk from the first side toward the second side while a pedestrian is crossing the roadway from the first side to the second side through the first crosswalk and the second crosswalk; and concealing the second crosswalk after the pedestrian has crossed the roadway.

2. The pedestrian support method according to claim 1, wherein the concealing of the first crosswalk includes expanding a concealed range of the first crosswalk as the pedestrian advances on the roadway.

3. The pedestrian support method according to claim 1, wherein the concealing of the first crosswalk includes concealing an area of the first crosswalk through which the pedestrian has passed while the pedestrian is crossing.

4. The pedestrian support method according to claim 1, further comprising:

adjusting a time when the first crosswalk begins to be concealed according to an expected arrival time when another pedestrian following the pedestrian arrives at an end of the first crosswalk on the first side.

5. The pedestrian support method according to claim 4, wherein the adjusting includes setting, in a case where a time period from a time when the pedestrian starts crossing the roadway to the expected arrival time is less than a threshold, the time when the first crosswalk begins to be concealed to be later than the expected arrival time.

6. The pedestrian support method according to claim 1, further comprising:

concealing, in a case where the pedestrian is considered as a first pedestrian, and there is a second pedestrian crossing the roadway from the second side to the first side through the first crosswalk and the second crosswalk while the first pedestrian is crossing, the second crosswalk from the second side toward the first side while the second pedestrian is crossing.

7. The pedestrian support method according to claim 6, wherein the concealing of the second crosswalk includes expanding a concealed range of the second crosswalk as the second pedestrian advances on the roadway.

8. The pedestrian support method according to claim 6, wherein the concealing of the second crosswalk includes concealing an area of the second crosswalk through which the second pedestrian has passed while the second pedestrian is crossing.

9. The pedestrian support method according to claim 6, further comprising:

continuing, in a case where there is no second pedestrian while the first pedestrian is crossing, displaying all of the second crosswalk until the first pedestrian finishes crossing the roadway.

* * * * *